I. J. MAHA.
MAIN SPRING WINDING MECHANISM FOR MOTOR STARTERS.
APPLICATION FILED APR. 15, 1920.

1,420,120.

Patented June 20, 1922.
4 SHEETS—SHEET 1.

Inventor
I. J. Maha

By
Attorney

I. J. MAHA.
MAIN SPRING WINDING MECHANISM FOR MOTOR STARTERS.
APPLICATION FILED APR. 15, 1920.
1,420,120.
Patented June 20, 1922.
4 SHEETS—SHEET 2.
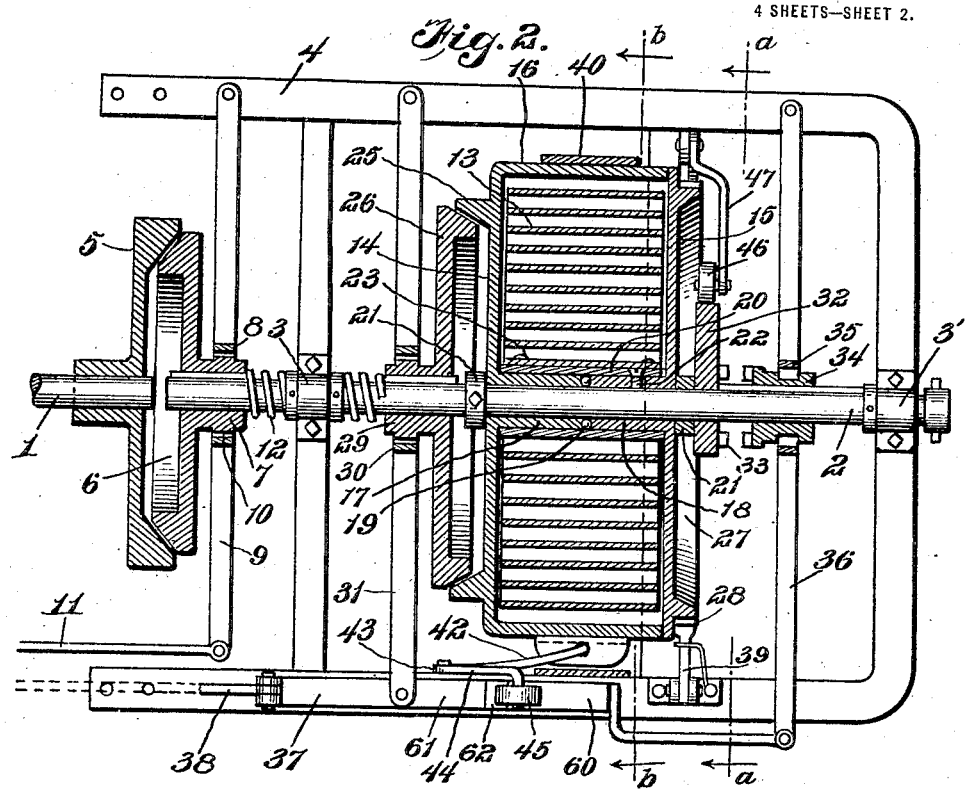
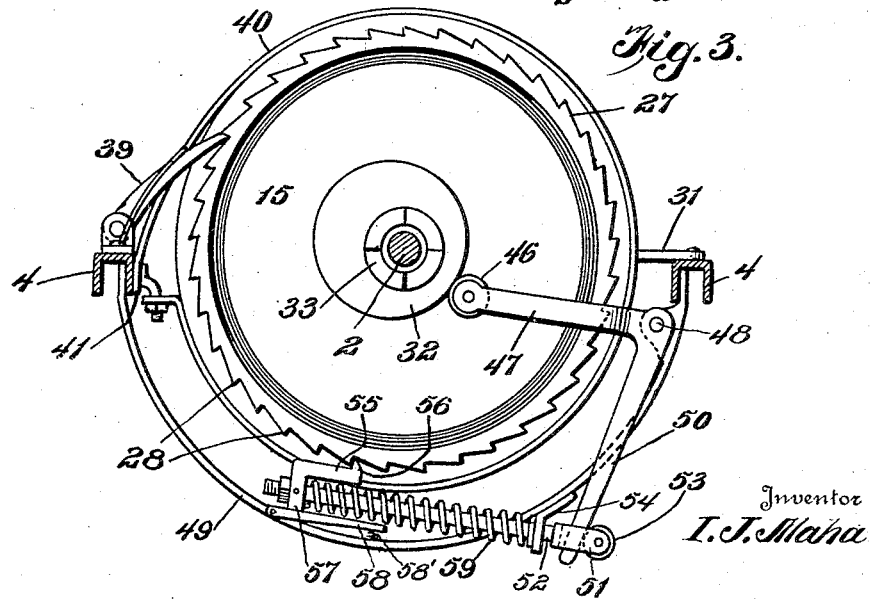
Inventor
I. J. Maha I. J. MAHA.
MAIN SPRING WINDING MECHANISM FOR MOTOR STARTERS.
APPLICATION FILED APR. 15, 1920.
1,420,120.
Patented June 20, 1922.
4 SHEETS—SHEET 4.
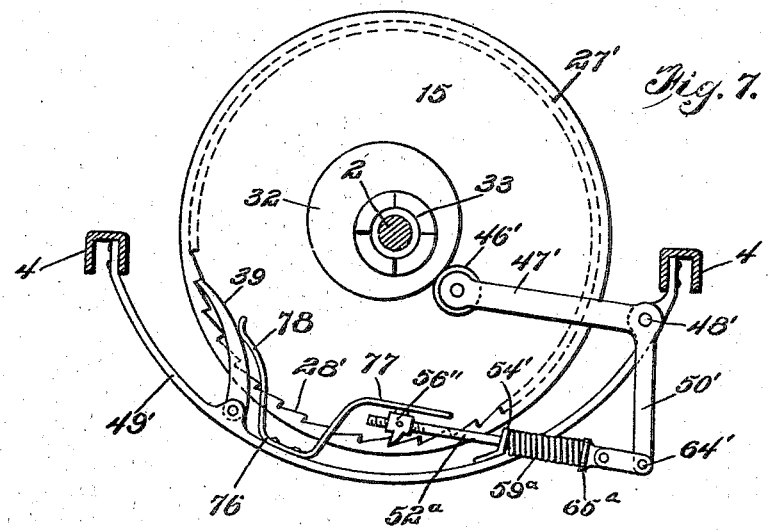
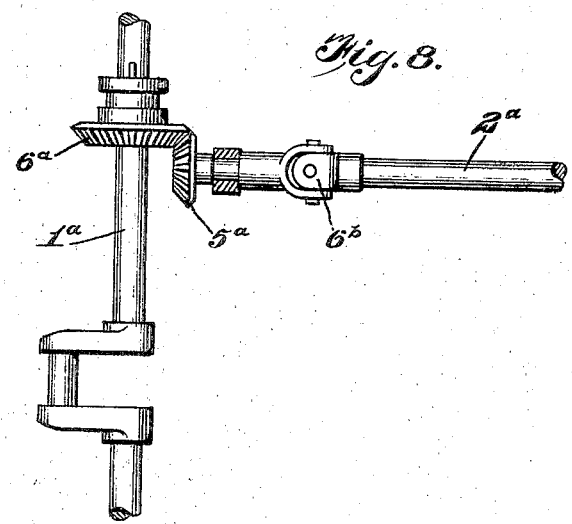
Inventor
I. J. Maha
By
Attorney

UNITED STATES PATENT OFFICE.

IRVIN J. MAHA, OF SLEEPY EYE, MINNESOTA.

MAINSPRING-WINDING MECHANISM FOR MOTOR STARTERS.

1,420,120.                    Specification of Letters Patent.    Patented June 20, 1922.

Application filed April 15, 1920. Serial No. 374,156.

*To all whom it may concern:*

Be it known that I, IRVIN J. MAHA, a citizen of the United States, residing at Sleepy Eye, in the county of Brown and State of Minnesota, have invented new and useful Improvements in Mainspring-Winding Mechanism for Motor Starters, of which the following is a specification.

This invention relates to motor starters and more particularly to a spring power type of the same adapted for use in connection with automobile or tractor motors or engines.

The present invention is a continuation in part of my copending application, filed January 4, 1919, Serial No. 269,613.

The primary object of the invention is to provide a comparatively simple, reliable and effective means for starting a motor, and one which is capable of being easily and rapidly connected to and disconnected from the motor for such purpose.

Another object of the invention is to provide a starter mechanism of the character mentioned, and one wherein the power of a normally tensioned coiled spring is used for starting a motor and the same is rewound and placed under tension, after starting the motor, by the application of power from the latter.

A further object of the invention is to provide a spring starting mechanism for motors or engines of the type aforesaid, and one wherein means is provided to prevent the over-winding of the coiled power spring irrespective of the power of the motor or engine being disconnected from the starting mechanism.

A still further object of the invention is to provide the spring starting mechanism with adjusting means whereby the coiled power spring of the same is tensioned or wound to any desired degree up to the maximum allowed for by the over-winding preventing means.

With the foregoing and other objects in view, such as will be readily apparent in the more detailed description of the preferred and modified forms of the invention, the latter, being a continuation, in part, of the form of the invention as shown and described in my copending application, Serial No. 269,613, and filed January 4, 1919, resides in the certain novel features of construction and arrangement of parts as will hereinafter be more fully described, set forth in the appended claims, and illustrated in the accompanying drawings, in which:

Figure 2 is a sectional plan view thereof,

Figure 3 is a section on the line *a—a* of Figure 2,

Figure 7 is a further similar view to that in Figures 3, 5 and 6, of another modification, and Figure 8 is a fragmentary plan view showing a modified form of driving means between the motor and starting shafts.

Figure 1:
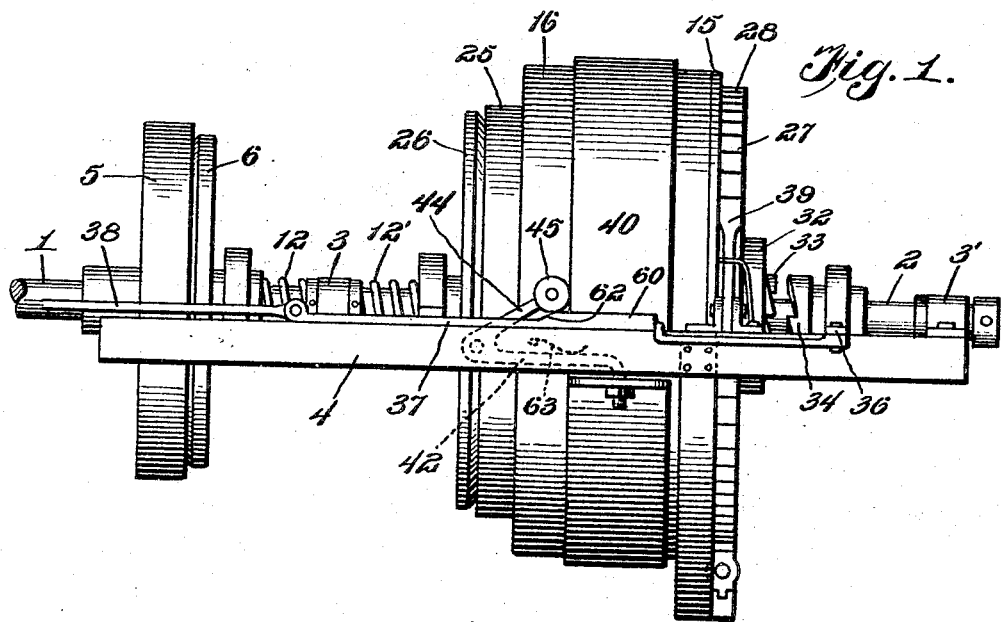
Figure 1 is a side elevation of the preferred embodiment of the invention.
Figure 4:
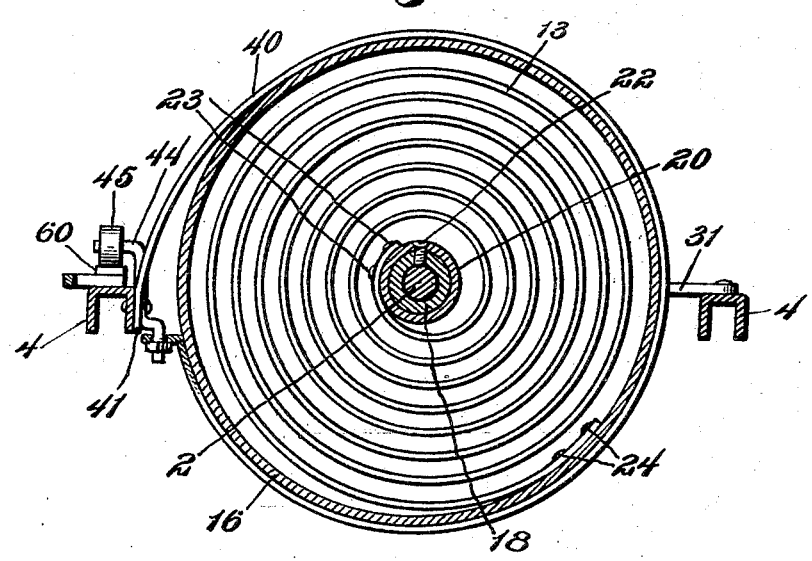
Figure 4 is a section on the line *b—b* of Figure 2.

Referring to the drawings, and more particularly to Figures 1 to 4 thereof, the preferred embodiment of the invention, as shown, comprises a motor shaft 1 and a starter shaft 2, separate from but arranged in axial alignment with the motor shaft. The starter shaft 2 is journaled in suitable bearing members 3 and 3' mounted upon a U-shaped frame structure 4, and has its inner end arranged in proximity to the outer end of the motor shaft 1 while its outer end may be, and preferably is, projected beyond the bearing 3', and arranged for the usual manual cranking operation for the starting of the motor or engine. In practice, the frame 4 may be a part of the frame of a vehicle, or a separate frame for supporting the starter mechanism, which separate frame may be fastened to the vehicle frame or chassis in any preferred manner. A clutch mechanism is provided for connecting and disconnecting the shafts 1 and 2, and the same comprises a tapered friction clutch disk 5 fixed on the shaft 1 and adapted to be engaged by a similar clutch disk 6 which is feathered to slide upon and rotate with the shaft 2. The clutch member 6 has an annularly grooved hub 7 which fits within a collar 8 carried by an adjusting lever 9 which is pivoted at one end to the frame 4, said collar being provided with one or more pins 10 engaging the groove of the hub, whereby the clutch member 6 is adapted to rotate with the shaft 2 without interference from the lever 9, but is adjustable longitudinally of said shaft through diverse swinging movements of said lever. A rod 11 connected with the free end of the lever 9 is provided for connection with a suitable control device on the vehicle, whereby the clutch member 6 may be retracted against the resistance of a spring 12 and adjusted for engagement with the clutch member 5, in which adjusting action the spring will assist in advancing the clutch member in an obvious manner. In the present instance I have shown the starting mechanism arranged to transmit motion to the motor shaft 1 in a counter-clockwise direction, but it is to be understood that, depending upon circumstances or conditions, the starting mechanism may be arranged to transmit motion to the motor shaft in either a clockwise or a counter-clockwise direction.

The starter mechanism comprises a spring starting motor, of a coiled or spiral spring type, the coiled motor spring 13 being arranged within a drum or casing comprising a pair of spaced disks 14 and 15 and an annular wall 16 carried by one of the disks, in the present instance, the disk 14. The wall 16 projects from the peripheral edge of the disk 14 toward and in close proximity to the inner face of the disk 15, thus forming with said disks an enclosing casing to shield and protect the spring from dust, dirt and the liability of injury. The disks 14 and 15 are each provided with inwardly projecting hubs 17 and 18, which are fitted to turn loosely on the shaft 2, and are spaced slightly apart to form a channel or race for the reception of anti-friction bearings or balls 19. The hubs 17 and 18 are held in accurate alignment by an enclosing sleeve 20, and from relative outward movement by the collars 21 secured by set screws or other similar means to the shaft 2. The sleeve 20 is fixed, by suitable fastening means 22 to the hub 18 of the disk 15 or the same may be an integral part of the said hub, but is free for relative rotary movement with respect to the hub 17 of the disk 14. To the sleeve 20, and consequently to the hub 18 of the disk 15, is secured, as indicated at 23, the inner end of the coiled spring 13, the outer end of which is suitably fastened to the inner periphery of the annular wall 16, as indicated at 24, and hence through said wall to the disk 14 and to the hub 17.

The disk 14 is employed for transmitting motion from the coiled spring 13 to the shaft 1 for the purpose of starting the motor or engine, while the disk 15 is employed for transmitting motion from the motor or engine shaft 1, through the shaft 2, for the purpose of rewinding the spring. Formed on the outer side of the disk 14 is a friction clutch member 25, adapted to be engaged by an adjustable friction clutch member 26, and formed on the outer face of the disk 15 is an annular member 27, which has its outer periphery formed to provide ratchet teeth 28. The hub 29, of the friction clutch member 26, is feathered to slide upon and rotate with the shaft 2, and is provided with a suitable shifting engagement with a collar 30 upon a shifting lever 31, whereby through reverse movements of the lever 31, the adjustable clutch member connected therewith may be shifted into and out of engagement with its companion clutch member 25.

Mounted on the shaft 2, and free to rotate thereon, is a cam or eccentric member 32, which abuts the collar 21 complemental thereto, and is held with its inner face in alignment with the peripheral edge of the annular member 27. The outer face of the cam or eccentric 32 is formed to provide a clutch face 33 which is complemental to and adapted to be engaged by a sliding or adjustable clutch member 34, which is feathered on the shaft 2 and is provided with suitable shifting engagement with a collar 35 carried by a shifting lever 36, whereby through reverse shifting movements thereof the adjustable clutch member 34 connected therewith may be shifted into and out of engagement with the clutch face 33 of the cam or eccentric 32. The levers 31 and 36 are pivoted at one end to one side of the frame 4 and are connected at their opposite or free ends for movement in unison by and with a shifter bar 37, the construction of the same being such that longitudinal movement of the shifter bar in opposite directions from a neutral position will throw one of the adjustable clutch members into action and the other out of action, or vice versa. The shifter bar is coupled to a rod 38 leading to a suitable control device (not shown) on the tractor, whereby said rod may be operated. The lever 31 associated with the clutch member 26 is adapted to retract said clutch member against the resistance of a spring 12', which assists in moving said clutch member into engagement with its complemental clutch member 25, and when the clutch member 26 is engaged with the latter, and the clutch members 5 and 6 are similarly engaged, the starter is connected to impart starting power to the engine shaft, the spring 13 being freed to uncoil for such purpose.

In order to permit the rotation of the disk 15 in the proper direction to wind the coiled spring 13, while holding said disk from retrograde action or motion, a suitable pawl and ratchet mechanism is provided, consisting of the ratchet teeth 28 upon the annular member 27 engaged by a spring actuated dog or pawl 39, the construction being such that the dog or pawl will permit the disk to have rewinding motion, in which action the dog slides over the inclined faces of the ratchet teeth, the dog engaging the shoulders of the teeth to lock the disk against reverse motion. Also, in order to hold the disk 14 from rotation under the action of the spring 13, until it is desired to utilize the power of the same for starting purposes, a brake device is provided for engaging and releasing said disk. This brake device comprises a friction brake band 40, fixed at one end 41 to the frame 4, and connected at its opposite end on the inner arm 42 of a bell-crank lever 43 pivotally mounted on the frame 4, the opposite arm 44 of which lever carries a cam roller 45. The brake band 40 surrounds and engages the wall 16, which thus serves as a friction brake surface, the band, when tightened, holding the disk 14 from rotation while the spring 13 is being wound and until its motor or engine starting action is desired, the release of the brake band permitting the spring to unwind and transmit rotary motion to the disk 14.

For the purpose of rewinding the coiled spring 13, and transmitting motion to the disk 15 from the shaft 2, after the clutches 5 and 6, and 33 and 34 have been engaged, and the clutch members 25 and 26 disengaged, the cam or eccentric now being coupled for rotary motion, the latter is engaged by a roller 46 carried on the free arm 47, of a bell-crank lever which is pivoted, as at 48, to a supporting member 49 secured at its opposite ends to the main frame 4 and depending therefrom on a curved line parallel to the periphery of the disks 14 and 15 and the wall 16, the opposite arm 50, of the bell-crank lever, projecting downwardly and outwardly of the supporting member 49 and engaging at its free end in a yoke 51, carried at the free end of a pawl actuating bar or rod 52, and in contacting relation with a roller 53 journaled in the yoke. A lug or bracket 54 is secured on the supporting member 49 and is slidably engaged by the rod 52 which has adjustably secured on its outer end a dog or pawl 55, the latter being of angular formation to provide a ratchet tooth engaging arm or portion 56, and a depending arm portion 57 which slidably engages in a guideway of a guide block or spring member 58 supported on and pivotally secured to an intermediate portion of the supporting member 49 for slight vertical movement with respect thereto, the same being held in normally raised position, by means of a spring 58', so that the dog or pawl 55 is retained in engagement with the ratchet teeth 28 during its working stroke, and is free to slide over the teeth in its reverse stroke. In this instance the pawl 55 is loosely mounted on the rod 52, being held thereon by a nut threaded on the free end of the rod, and interposed between the portions 57 and the lug 54, and surrounding the rod 52 is a coiled spring 59. A set screw, as shown, is provided to keep the pawl from turning on the rod 52.

In the use of the winding mechanism for the recoiling of the main power spring 13, with the clutch members 5 and 6, and the clutch members 33 and 34 coupled, power from the motor or engine is transmitted from the shaft 1 to the shaft 2 and the cam or eccentric 32 is revolved in contact with the roller 46 which forces the bell-crank lever downward and outward, the arm 50 acting on the roller 53 to draw the rod 52 outward so as to compress the coiled spring 59. As soon as the highest point on the cam or eccentric engages the roller 46 of the bell-crank lever, the spring 59 is compressed and the pawl 56 engages the ratchet in position for a working stroke, and as the highest point of the eccentric or cam passes over the point in which the roller moves along the converging face of the same, the spring 59 expands and actuates the pawl for the rotation of the disk 15 and consequently coils up the main spring 13 to the degree within the movement of the pawl 55 and of the expansion of the spring 59. This operation continues during successive revolutions of the cam or eccentric 32, and at the end of each working stroke of the pawl 55, the pawl 39 engages with a shoulder of the nearest ratchet tooth to prevent retrograde movement of the disk 15 and consequently the slipping or uncoiling of the spring 13. As soon as the spring 13 is fully wound, or its power is equal to or slightly greater than that of the spring 59, when under compression, the latter will cease to function, even though the cam continues to rotate, and such further rotation of the cam and the consequent actuation of the bell-crank lever results in the idle reciprocation of the rod 52 in the bracket or lug 54 and the pawl 55, without the actuation of the latter. From the foregoing it is to be seen that the construction and arrangement of the parts described therein, provide for positively and effectually preventing the over-winding of the main power spring, and consequently the possible breaking of the same as would be the result of over-winding, also that the action is automatic, and does not require that the power be immediately cut off from the winding mechanism. However, in the winding operation, the pawl 39 in its sliding engagement with the teeth of the ratchet 28, gives off a clicking sound, which acts as a "tell-tale" for the proper operation of the device, and when the spring 13 is fully wound, the clicking ceases, so that the absence of this sound allows for the actuation of the clutch members 5 and 6, and consequently 33 and 34 back to off or neutral position with full knowledge that the winding operation is fully completed.

For the purpose of normally maintaining the friction brake band in engagement with the surface 16 at all times in the neutral position of the parts, and during the adjustments of the rewinding clutch device or members, while effecting an automatic release and tightening of the brake band in the in and out adjustments of the clutch members for connecting the spring motor for starting purposes, the bar or member 37 is suitably constructed to control the bell-crank lever 43 for brake tightening and releasing actions.

To this end, the bar 37 is provided with plane surfaces 60 and 61 arranged at different elevations and connected by an intervening inclined or cam surface 62 upon which surfaces the roller 45 is adapted to ride. The roller 45 normally engages the surface 60 with which it is in contact when the parts are in the neutral position, and also in the adjustment of the clutch members 33 and 34 into position for the rewinding action, whereby the bell-crank lever 43 is held in brake band applying position. When, however, the bar 37 is shifted forwardly to the degree necessary to move the clutch members 26 into engagement with the clutch member 25, the roller 45 travels down the inclined surface 62 and engages the surface 61, thus allowing the bell-crank lever 43 to be depressed by the action of a spring 63 to release the brake band, thus permitting the disk 14 to be driven by the unwinding action of the main spring 13 to transmit motion to the shaft 2, and through the clutch members 5 and 6 to the motor or engine shaft 1.

Figure 5:
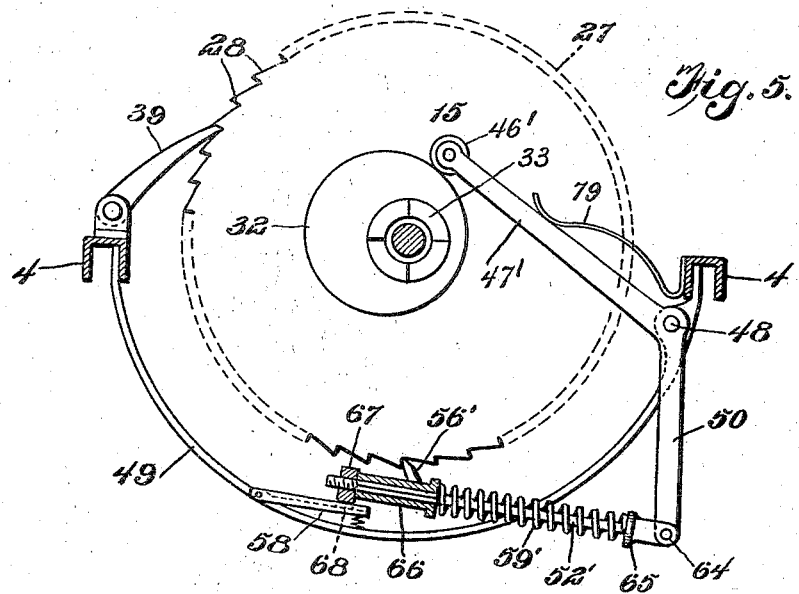
Figure 5 is a view similar to that in Figure 3 of a modified form of the invention.
Figure 6:
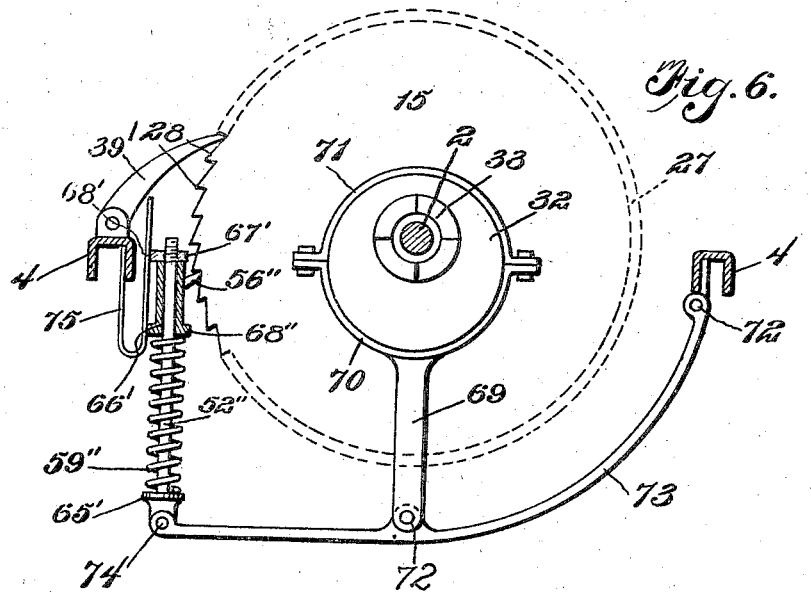
Figure 6 is another similar view to that of Figures 3 and 5 of a second modified form thereof.

Referring to Figures 5, 6 and 7 in which similar characters of reference designate corresponding parts in the several views of the drawing, and more particularly to Figure 5, there is shown a slightly modified form of actuating spring and pawl winding mechanism, and in this instance the arm 50 of the bell-crank lever is shown to be pivotally connected, as at 64, to the rod 52', the latter being formed with an annular shoulder 65 contacted directly by the coiled spring 59'. In this case, the pawl or dog 56' is formed with or carried by a sleeve 66 which is supported on a squared portion of the rod 52', and held in position thereon and against the adjacent end of the spring 59', by means of the nut 67 which is threaded on the end of the rod. This nut 67 is provided with a lug or flanged portion 68 slidably engaged in the guideway of the guide block 58 which is carried by the supporting member 49. The arm 47', in this instance, is of greater length than the corresponding arm 47 of the bell-crank lever of the preferred form of the invention, and is positioned to permit the roller 46' to contact the peripheral edge of the cam 32 at a point wherein its path of movement is in a direction opposite to that of the arm 47, and which acts to force the arm 50 and the rod 52' in a direction to compress the spring 59'. The pawl 56' is unaffected during this compression stroke of the arm 50 and the rod 52', but is actuated for the rewinding of the coiled power spring 13 during its expansion, and consequently during the reverse or outward movement of the arm and rod. The successive compression and expansion operations continue throughout successive revolutions of the cam 32, and until the tension of the coiled power spring 13 is equal to or slightly greater than that of the spring 59', when further movement of the pawl 56' will cease, and the rod 52' will idly reciprocate in the pawl, compressing the spring 59' on each stroke but without the expansion of the latter affecting the pawl. To retain the arm 47' in contact with the periphery of the cam 32 under all conditions of operation a leaf spring 79 is provided, the same being secured at one end to the frame 4 and having its free end bearing against the outer face of the arm.

In Figure 6, there is shown the third form of the invention and the same comprises the application of an eccentric pitman 69 to the cam or disk 32, and for this purpose the pitman 69 is provided with an integral yoke portion 70 and a removable portion 71, the latter being secured to the former in any suitable manner to clampingly engage the periphery of the disk 32. The lower end of the pitman 69 is pivoted, as at 72, to an intermediate portion of a lever 73 pivoted at one side of the main frame 4 and curving downwardly therefrom and extending in a horizontal plane to a point of pivotal engagement, as at 74, with the vertically disposed rod 52''. The rod 52'' is provided with an annular shoulder 65' supporting the spring 59'' and the sliding sleeve 66' of the pawl 56''. The sleeve 66' is retained on a squared portion of the rod 52'' in contact with the adjacent spring end by means of a nut 67', and both the same and the latter are provided with lugs or flanges 68' and 68'' respectively, which are adapted to contact a guide surface 75 and slide there-along during the actuation of the winding mechanism thus provided. The guide surface 75 is formed of a strip or plate bent substantially U-shape and having one leg thereof secured to the frame 4. The operation of this device is the same as in the other instances hereinbefore cited.

In Figure 7, the modification, as shown therein, comprises an arrangement similar to the foregoing modifications except that the annular flange or member 27', of the disk 15, is provided with ratchet teeth 28' on its inner periphery as herein before described, and in this instance the cam or eccentric 32 is used for actuating the bell-crank lever, on the arm 47′ of which is mounted the usual roller 46′ in contact with the periphery of the cam or eccentric 32, while the arm 50′, extending downward from the pivot point 48′, of the lever, is pivotally connected at 64′ to the end of the rod 52ª. The bell-crank lever is pivotally supported from the supporting member 49′, in the manner herein before set forth, and the latter is secured at its opposite ends from the main frame 4. The rod 52ª is provided with an annular shoulder 65ª, and is slidably mounted in the lug or ear 54′, and interposed between the former and the latter is the coiled spring 59ª, the latter being normally contracted, and adapted to be expanded on the outward stroke of the rod 52ª. The opposite ends of the coiled spring 59ª are secured, one to the bracket 54′ and the other to the annular shoulder 65ª for such purpose. Adjustably secured on the inner or free end of rod 52ª is a dog or pawl 56″ adapted to engage the teeth of the ratchet 28′, the said end of the rod 52ª being suitably threaded for receiving the dog or pawl, and a set screw, as shown, is provided to prevent the pawl from turning thereon when properly positioned. The pawl 39′ is provided for cooperating with the ratchet 28′ for preventing the retrograde movement of the disk 15 during the winding operation of the main spring of the starting motor, and in this case, the pawl is pivotally mounted on the supporting member 49′. For guiding the dog or pawl 56″ and holding the pawl 39′ in engagement with the ratchet 28′, a leaf or strap spring 76 is secured to the supporting member 49′, and the same consists of an arm 77 extending in a plane parallel to the path of travel of the dog or pawl 56″ and in contact therewith, and an arm 78, opposite to the arm 77, resiliently contacting the pawl 39′. In this instance, upon the rotation of the cam 32, with the shaft 2, the bell-crank lever is operated to draw the rod 52ª outward, expanding the spring 59ª, and withdrawing the dog 56″ from its advanced position to position for a working stroke. As soon as the highest point on the cam 32 is reached or passed the spring 59ª contracts, bringing the bell-crank lever back to normal position and forcing the dog 56″ in the direction of the rotation of the disk 15, and consequently rewinding the main spring 13. This operation is repeated throughout successive revolutions of the cam 32, and until the spring 13 is fully wound, or until its power is greater than that of the spring 59ª, when the dog or pawl 56″ is rendered inoperative for the further rotation of the disk 15, or the further recoiling of the spring 13, thus preventing the over-winding or possible breakage of the same.

In Figure 8, there is shown a modification in the driving connection between the motor shaft 1ª and the starter shaft 2ª which may be employed when it is necessary to dispose these two shafts at a right angle or other angles to each other, as is necessary in the application of the invention to some forms of tractors or trucks. As shown herein, a gear 6ª, feathered to slide upon and rotate with the shaft 1ª, is provided in lieu of the disk 6, and this gear meshes with a gear 5ª on the shaft 2ª, which is substituted for the clutch member 5, the gear 6ª being adapted for cooperation with a shifting device to throw it into and out of meshing relation. The shaft 2ª as shown is composed of sections united by a universal or other similar joint 6ᵇ, thus allowing the gears to mesh while the shafts operate at different working angles as will be readily understood.

From the foregoing it will be readily apparent that the invention provides for a comparatively efficient and reliable spring operated starting mechanism for automobile engines or motors, and one easy of control, and automatic with respect to the rewinding of the main spring against over-winding and consequent breakage.

It is to be understood that various changes, modifications and substitutions of parts and the arrangement thereof may be resorted to in the carrying out of the same without departing from the spirit and scope thereof.

Having thus fully described the invention, what I claim is:

1. The combination with a spring motor starter for explosive engines including clutch connections between the motor shaft and the crank shaft of an engine, of complemental pairs of clutch members disposed at opposite sides of the motor and secured to complemental parts thereof, interconnected means for actuating said clutches for alternately connecting the motor to its shaft for transmitting power from the power spring thereto in one operative position of the clutches and for rewinding the power spring of the motor therefrom in the other operative position of the clutches, a brake band associated with one part of the motor and operable with said clutch actuating means for alternately holding the power spring of the motor in wound condition and releasing the same correspondingly with respective movements of said clutches, means for rewinding the power spring of the motor, and means governed by the maximum tension of the power spring of the motor for rendering said rewinding means inoperative, when the latter has been wound to a maximum degree.

2. The combination with a spring motor starter for explosive engines including clutch connections between the motor shaft and the crank shaft of an engine, of complemental pairs of clutch members disposed at opposite sides of the motor and secured to complemental parts thereof, interconnected means for actuating said clutches for alternately connecting the power spring of the motor to its shaft for transmitting power from the power spring thereto in one operative position of the clutches and for rewinding the power spring of the motor therefrom in the other operative position of the clutches, a brake band associated with one part of the motor and operable with said clutch actuating means for alternately holding the power spring of the motor in wound condition and releasing the same correspondingly with respective movements of said clutches, means for rewinding the power spring of the motor, and means governed by the maximum tension of the power spring of the motor for rendering said rewinding means inoperative, when the latter has been wound to a maximum degree.

3. The combination with a spring motor starter for explosive engines including clutch connections between the motor shaft and the crank shaft of an engine, of complemental pairs of clutch members disposed at opposite sides of the motor and secured to the complemental parts thereof, interconnected means for actuating said clutches for alternately connecting the motor to its shaft for transmitting power thereto in one operative position of the clutches and for rewinding the power spring of the motor therefrom in the other operative position of the clutches, a brake band associated with one part of the motor, said brake band having one end connected to the frame supporting the motor and engine in position and the other of its ends connected with said clutch actuating means and operable therewith for alternately holding the motor in wound condition and releasing the same correspondingly with respective movements of said clutches and the said actuating means thereof, means for rewinding the power spring of the motor, and means governed by the maximum tension of the power spring of the motor for rendering said rewinding means inoperative, when the latter has been wound to a maximum degree.

4. In a motor starter, a motor shaft, a starter shaft, clutch connections between said motor shaft and said starter shaft, spaced disks having abutting hub members mounted on said starter shaft, one of said disks having an annular flange enclosing the space between said disks and overlying the periphery of the other of said disks, a power spring coiled between said disks and having its opposite ends connected to each one of said disks, complemental pairs of clutch members disposed at opposite sides of said disks and secured to complemental parts thereof, interconnected means for actuating said clutches for alternately connecting said disks to said starter shaft for transmitting power thereto in one operative position of the clutches and for rewinding the coiled spring therefrom in the other operative position of the clutches, a brake band associated with one of said disks and operable with said clutch actuating means for alternately holding the coiled spring in wound condition and releasing the same correspondingly with respective movements of said clutches and their interconnected actuating means, means for rewinding the power spring of the motor, and means governed by the maximum tension of the power spring of the motor for rendering said rewinding means inoperative when the latter has been wound to a maximum degree.

5. In a motor starter, a motor shaft, a starter shaft, clutch connections between said motor shaft and said starter shaft, spaced disks having abutting hub members mounted on said starter shaft, one of said disks having an annular flange enclosing the space between said disks and overlying the periphery of the other of said disks, a sleeve encircling the hub members of said disks and secured to one of the same, a power spring coiled between said disks and having one of its ends secured to said annular flange and the other thereof to said sleeve, complemental pairs of clutch members disposed at opposite sides of said disks and secured to complemental parts thereof, interconnected means for actuating said clutches for alternately connecting said disks to said starter shaft for transmitting power thereto in one operative position of the clutches and for rewinding the coiled spring therefrom in the other operative position of the clutches, a brake band associated with one of said disks and operable with said clutch actuating means for alternately holding the coiled spring in wound condition and releasing the same correspondingly with respective movements of said clutches and their interconnected actuating means, means for rewinding the power spring of the motor, and means governed by the maximum tension of the power spring of the motor for rendering said rewinding means inoperative when the latter has been wound to a maximum degree.

6. In a device of the class described, an engine shaft, a starter shaft adapted to be connected and disconnected to and from said engine shaft, a starting motor on said starter shaft a coiled power spring for said starting motor, means for utilizing the power from said power spring for engine starting purposes, pawl and rachet means for rewinding said power spring after the same has been uncoiled, a cam loosely mounted on said starter shaft, a clutch mechanism for connecting and disconnecting said cam to and from said starter shaft, a bell crank lever, a roller carried on one arm of said bell crank lever and disposed in contact with the periphery of said cam, a rod engaged at one end by the other arm of said bell crank lever and carrying the pawl at its other end, and a coiled spring on said rod and adapted to be alternately expanded and contracted during the operation of said bell crank lever for the actuation of said pawl with the ratchet, said pawl and ratchet means being rendered inoperative when said power spring has been rewound to a maximum degree.

In testimony whereof I affix my signature.

IRVIN J. MAHA.